3,192,202
3-THIOKETALS OF PREGNADIENE AND METHOD OF PREPARATION THEREOF
George Karmas, Bound Brook, and Irving Scheer, Somerville, N.J., assignors to Ortho Pharmaceutical Corporation, a corporation of New Jersey
No Drawing. Filed Mar. 12, 1964, Ser. No. 351,515
18 Claims. (Cl. 260—239.5)

This invention relates to novel methods of preparing 6α-methyl-4-pregnen-17α-ol-20-one and esters thereof and to novel intermediates prepared by such methods.

6α-methyl-4-pregnen-17α-ol-20-one and its esters have been found to be potent progestational agents and are the subject of United States Serial No. 125,995, filed July 24, 1961.

It is an object of the present invention to provide novel methods of preparing 6α-methyl-4-pregnen-17α-ol-20-one and esters thereof.

It is also an object of the present invention to provide novel thioketal compounds.

Other objects will be apparent from the detailed description of the invention hereinafter provided.

The reaction sequence of the present invention is as follows:

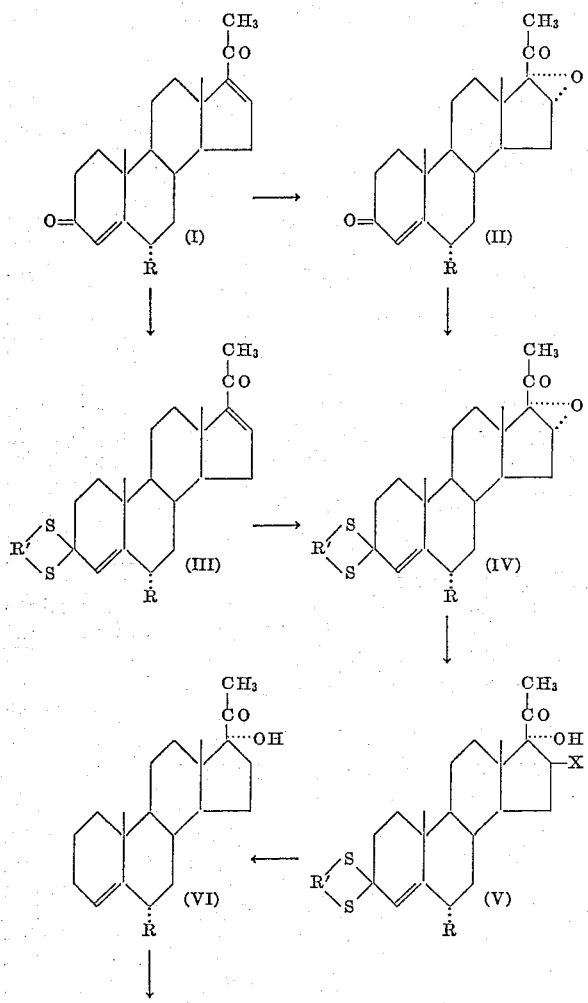

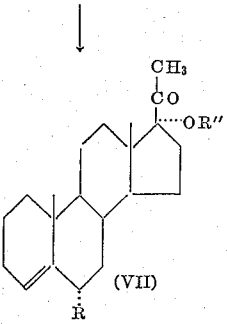

In the foregoing reaction sequence, R is hydrogen or methyl, R' is ethylene or propylene, R" is the acyl residue of an organic carboxylic acid and X is chlorine, bromine or iodine.

The novel compound 6α-methyl-16α,17α-epoxyprogesterone-3-alkylenethioketal (IV) can be prepared by alternate routes starting with 6α-methyl-16-pregnene-3,20-dione (I). Compound I may either be epoxidized to form 6α-methyl-16α,17α-epoxyprogesterone (II) with subsequent thioketalization to form Compound IV, or Compound I may be selectively thioketalized to form the novel compound 6α-methyl-16-pregnene-3,20-dione 3-alkylenethioketal (III) with subsequent epoxidation to form Compound IV.

Thioketalization is carried out with an alkyl dithiol, such as ethanedithiol, 1,2-propanedithiol or 1,3-propanedithiol, in the presence of a catalyst. The preferred catalyst is pyridine hydrochloride.

Epoxidization is carried out with an alkaline solution of hydrogen peroxide.

The 16α,17α-epoxy group is hydrohalogenated to form the novel 6α-methyl-16β-halo-4-pregnen-17α-ol-3,20-dione 3-alkylenethioketal (V). Hydrohalogenation may be carried out through the use of hydrogen bromide, hydrogen chloride or hydrogen iodide in an aqueous or non-aqueous media. Upon simultaneous desulfurization and dehalogenation with Raney nickel 6α-methyl-4-pregnen-17α-ol-20-one (VI) is formed. Compound VI is then esterified to form the 17α ester (VII).

The following examples are intended to illustrate, but not to limit, the scope of the present invention.

EXAMPLE I

*6α-methyl-4,16-pregnadiene-3,20-dione 3-ethylenethioketal*

A solution of 3.0 grams of 6α-methyl-16-dehydroprogesterone in 15 ml. of tetrahydrofuran is diluted with 25 ml. of methanol and stirred at 25° C. while 5.0 grams of pyridine hydrochloride is added. After dissolution of the latter, 1.3 ml. of ethanedithiol is added over a period of five minutes and the clear reaction mixture is maintained at 25° C. for two hours and then at 40° C. for ten minutes. One hundred ml. of water is now added and the organic solvents are removed by concentration under reduced pressure. The reaction product is a viscous oil. After isolation by extraction with ether a portion of the thioketal may be crystallized directly from ether, but it is preferably purified by development on a column of neutral alumina and elution with 20% benzene-in-hexane. The crystalline eluates thus obtained are combined and recrystallized from a small amount of ethyl ether to afford 6α - methyl - 4,16 - pregnadiene - 3,20 - dione 3 - ethylenethioketal as fine white prisms which melt at 169–170° C.

*Analysis.*—Calcd. for $C_{24}H_{34}OS_2$: C, 71.64; H, 8.51. Found: C, 71.64; H, 8.62.

λλ Max.: 6.00, 6.28, 7.3, 8.08, 9.60, 10.20, 11.00, 11.40, 12.00μ.

EXAMPLE II

*4,16-pregnadiene-3,20-dione 3-ethylenethioketal*

A solution of 3.0 g. of 16-dehydroprogesterone and 2.0 g. of pyridine hydrochloride in 50 ml. of methanol is stirred vigorously at 25° C. while 1.0 ml. of ethanedithiol is added over a period of one minute. The clear solution is held at 25° C. for two hours and then at 40° C. for ten minutes and then it is diluted with 200 ml. of water and concentrated under vacuum to remove methanol. The tacky insoluble product is extracted with two 75 ml. portions of ethyl ether, and after evaporation of the ether solution the residue is developed onto a chromatographic column of neutral alumina. Elution with benzene-hexane affords a crystalline residue which is recrystallized from methylene chloride-methanol to yield 1.8 g. of 4,16-pregnadiene-3,20-dione 3-ethylenethioketal as white prisms which melt at 154–161° C. This is of satisfactory quality for further transformations. An analytical sample recrystallized from ethyl ether melts at 164–165° C.

*Analysis.*—Calcd. for $C_{23}H_{32}OS_2$: C, 71.15; H, 8.30. Found: C, 70.92; H, 8.28.

λλ Max.: 6.00, 6.30, 8.10, 10.23, 11.58, 11.77, 12.00, 12.80μ.

EXAMPLE III

*4,16-pregnadiene-3,20-dione 3-trimethylenethioketal*

A solution of 6.0 g. of 16-dehydroprogesterone and 6.0 g. of pyridine hydrochloride in 200 ml. of methanol is stirred vigorously while 2.5 ml. of 1,3-propanedithiol is added. The clear solution is held at 25° C. for one hour and then at 50° C. for twenty minutes and then it is diluted with 200 ml. of water and concentrated under vacuum to remove methanol. The tacky insoluble product is extracted with two 100 ml. portions of ethyl ether and after evaporation of the ether solution the residue is developed onto a chromatographic column of neutral alumina. Elution with ether-hexane affords a crystalline residue which is recrystallized from ethyl acetate to yield 1.4 g. of 4,16-pregnadiene-3,20-dione 3-trimethylenethioketal as white prisms which melt at 186–188° C.

*Analysis.*—Calcd. for $C_{24}H_{34}OS_2$: C, 71.64; H, 8.51. Found: C, 70.11; H, 8.38.

λλ Max.: 6.00, 6.29, 8.10, 11.61, 12.19, 12.83μ.

In like manner 6α-methyl-4,16-pregnadiene-3,20-dione 3-trimethylenethioketal is prepared starting with 6α-methyl-16-dehydroprogesterone.

EXAMPLE IV

*6α-methyl-16α,17α-epoxyprogesterone*

A solution of 2 g. of 6α-methyl-16-pregnene-3,20-dione in 300 ml. of methanol is cooled to 5° C. and stirred while 4.8 ml. of 2.65 N. aqueous sodium hydroxide is added followed by 1.0 ml. of 30% aqueous hydrogen peroxide dissolved in 15 ml. of methanol. The clear reaction mixture is kept at 0° C. for 24 hours and is then diluted with 50 ml. of water and concentrated under reduced pressure to remove methanol. The crystalline crude reaction product is recrystallized from methanol to afford white prisms of 6α-methyl-16α,17α-epoxyprogesterone.

λλ Max.: 5.86, 5.96, 6.20, 7.22, 8.08, 9.13, 10.95, 11.70μ.

In Examples V, VI and VII, Procedure A refers to the epoxidation of the thioketal and Procedure B refers to the thioketalization of the epoxide.

EXAMPLE V

*6α-methyl-16α,17α-epoxyprogesterone 3-ethylenethioketal*

PROCEDURE A

A solution of 0.6 g. of 6α-methyl-16-pregnene-3,20-dione 3-ethylenethioketal in 15 ml. of tetrahydrofuran plus 6 ml. of methanol plus 3 ml. of water is stirred at 5° C. while a solution of 0.25 g. of sodium hydroxide in 2 ml. of water and 3 ml. of methanol is added, followed immediately by 2.4 ml. of aqueous 30% hydrogen peroxide. This mixture is stirred at 5° C. for fourteen hours and is then diluted with 70 ml. of water, precipitating the crystalline epoxide which is filtered off and dried in air. Recrystallization of the crude epoxide from ethyl ether affords 6α-methyl-16α,17α-epoxyprogesterone 3-ethylenethioketal as white prisms which melt at 143–144° C.

*Analysis.*—Calcd. for $C_{24}H_{34}O_2S_2$: C, 68.93; H, 8.18. Found: C, 68.59; H, 8.32.

λλ Max.: 5.86, 7.22, 9.18, 10.92, 11.70μ.

PROCEDURE B

To a solution of 0.4 g. of 6α-methyl-16α,17α-epoxyprogesterone in 6 ml. of methanol is added 0.5 ml. of ethanedithiol and 0.5 g. of pyridine hydrochloride and this mixture is stirred at 25° C. for ninety minutes and then at 0°C. for thirty minutes. The crystalline 6α-methyl-16α,17α-epoxyprogesterone 3-ethylenethioketal which has formed is filtered off, washed with cold methanol and dried in air. As thus obtained, this material melts at 140–142° C. and has an infrared spectrum identical with that described in Procedure A.

EXAMPLE VI

*16α,17α-epoxyprogesterone 3-ethylenethioketal*

PROCEDURE A

A solution of 2.0 g. of 16-dehydroprogesterone 3-ethylenethioketal in 50 ml. of tetrahydrofuran is diluted with 15 ml. of methanol plus 8 ml. of water and then is stirred at 0–5° C. while a solution of 0.75 g. of sodium hydroxide in 6.5 ml. of water is added and followed immediately by the addition of 8 ml. of 30% aqueous hydrogen peroxide. This reaction mixture is stirred at 5° C. for eighteen hours and then it is slowly diluted with 100 ml. of water. The white crystals of epoxide are filtered off and are recrystallized from ethyl acetate to afford 1.9 g. of 16α,17α-epoxyprogesterone 3-ethylenethioketal as fine white prisms which melt at 185–187° C.

PROCEDURE B

A mixture of 2 g. of 16α,17α-epoxyprogesterone, 2 g. of pyridine hydrochloride and 2 ml. of ethanedithiol in 25 ml. of methanol is stirred vigorously at 25° C. for two and one-half hours and then at 0–5° C. for two hours. The crude thioketal is filtered off, washed with cold methanol, dried in air, and then it is recrystallized from methylene chloride-methanol to afford 1.8 g. of 16α,17α-epoxyprogesterone 3-ethylenethioketal as white prisms which melt at 186–188° C. This is identical in all respects with the material prepared by Procedure A.

*Analysis.*—Calcd. for $C_{23}H_{32}O_2S_2$: C, 68.36; H, 7.98. Found: C, 68.32; H, 8.23.

λλ Max.: 5.85, 11.20, 11.73, 11.98, 12.08, 12.88, 14.40μ.

EXAMPLE VII

*16α,17α-epoxyprogesterone 3-trimethylenethioketal*

PROCEDURE A

A solution of 1.2 g. of 16-dehydroprogesterone 3-trimethylenethioketal in 32 ml. of tetrahydrofuran is diluted with 15 ml. of methanol plus 7.5 ml. of water and then is stirred at 0–5° C. while a solution of 0.75 g. of sodium hydroxide in 3 ml. of water is added and followed immediately by the addition of 3.75 ml. of 30% aqueous hydrogen peroxide. This reaction mixture is stirred at 5° C. for eighteen hours and then it is slowly diluted with 100 ml. of water. The crystalline epoxide is filtered off and dried in air, and then it is recrystallized from ethyl acetate to afford 1.0 g. of 16α,17α-epoxyprogesterone 3-trimethylenethioketal as white prisms which melt at 194–196° C.

PROCEDURE B

A mixture of 5.0 g. of 16α,17α-epoxyprogesterone, 5.0 g. of pyridine hydrochloride and 5 ml. of 1,3-propanedithiol in 70 ml. of methanol is stirred at 25° C. for two hours and then it is stored at 0° C. for twenty hours. The crude thioketal is filtered off, washed with cold methanol, dried in air, and recrystallized from ethyl acetate to afford 2.0 g. of 16α,17α-epoxyprogesterone 3-trimethylenethioketal as white prisms which melt at 194–196°, and are identical with the material prepared by Procedure A.

Analysis.—Calcd. for $C_{24}H_{34}O_2S_2$: C, 68.93; H, 8.18. Found: C, 69.21; H, 8.42.

λλ Max.: 5.85, 10.31, 11.08, 11.57, 12.90, 14.42μ.

EXAMPLE VIII

6α-methyl-16β-bromo-4-pregnen-17α-ol-3,20-dione 3-ethylenethioketal

A suspension of 0.8 g. of 6α-methyl-16α,17α-epoxyprogesterone 3-ethylenethioketal in 8 ml. of glacial acetic acid is stirred at 18° C. while 2 ml. of 15% hydrogen bromide-in-glacial acetic acid is added. This reaction mixture is maintained at 18–20° C. for fifteen minutes and at 25° C. for thirty minutes and then it is diluted with 35 ml. of water. The crystalline white bromohydrin which is thus precipitated is filtered off, washed well with water, and is dried in air. As thus obtained, it is suitable for reduction with Raney nickel.

For characterization, 6α-methyl-16β-bromo-4-pregnen-17α-ol-3,20-dione 3-ethylenethioketal may be obtained as white prisms which melt with decomposition at 171–174° C. by recrystallization from ether-methanol.

Analysis.—Calcd. for $C_{24}H_{35}O_2S_2Br$: C, 57.75; H, 7.06. Found: C, 57.74; H, 7.29.

λλ Max.: 2.90, 5.82, 7.37, 10.10, 11.47, 12.20, 13.80μ.

EXAMPLE IX

16β-chloro-4-pregnen-17α-ol-3,20-dione 3-ethylenethioketal

A mixture of 1.0 g. of 16α,17α-epoxyprogesterone 3-ethylenethioketal and 0.6 ml. of 35% aqueous hydrogen chloride in 5 ml. of acetone is boiled under reflux for two hours and then it is diluted with 40 ml. of water and stored at 0° C. until the insoluble chlorohydrin is crystalline enough to be isolated by filtration. The material thus obtained weighs 1.08 g. and is suitable for reduction with Raney nickel.

For characterization, 16β,chloro-4-pregnen-17α-ol-3,20-dione 3-ethylenethioketal is obtained as white prisms which melt at 191–193° by recrystallization from methylene chloride-methanol.

Analysis.—Calcd. for $C_{23}H_{33}O_2S_2Cl$: C, 62.63; H, 7.54. Found: C, 62.30; H, 7.58.

λλ Max.: 2.91, 5.83, 10.17, 11.71, 12.04, 12.90, 13.70, 14.70μ.

EXAMPLE X

16β-bromo-4-pregnen-17α-ol-3,20-dione 3-ethylenethioketal

A mixture of 1.9 g. of 16α,17α-epoxyprogesterone 3-ethylenethioketal and 36 ml. of acetic acid is stirred at 18° C. while 4.8 ml. of 15% hydrogen bromide-in-glacial acetic acid is added over a period of five minutes. This reaction mixture is maintained at 18–20° C. for one hour and then it is slowly diluted with 500 ml. of water. The insoluble crystalline white bromohydrin is filtered off, washed well with water and dried in air to afford 2.25 g. which melts at 192–195° C. (with decomposition). As thus obtained, it is suitable for reduction with Raney nickel.

For characterization, 16β-bromo-4-pregnen-17α-ol-3,20-dione 3-ethylenethioketal is recrystallized from methylene chloride-ethyl ether to white prisms which melt at 196–198° C.

Analysis.—Calcd. for $C_{23}H_{33}O_2S_2Br$: C, 56.97; H, 6.85. Found: C, 56.78; H, 7.01.

λλ Max.: 2.90, 5.81, 10.17, 11.70, 12.79, 13.20, 13.81, 14.70μ.

EXAMPLE XI

16β-iodo-4-pregnen-17α-ol-3,20-dione 3-ethylenethioketal

A mixture of 1.0 g. of 16α,17α-epoxyprogesterone 3-ethylenethioketal and 1.4 ml. of 60% aqueous hydrogen iodide in 20 ml. of acetone is boiled under reflux for fifteen minutes and then it is diluted with a solution of 0.5 g. of potassium bicarbonate and 1.0 g. of sodium thiosulfate in 200 ml. of water. After brief stirring to bleach the free iodine, the pale yellow solid is filtered off and dried in air. The 1.28 g. of crude iodohydrin thus obtained is suitable for reduction with Raney nickel.

For characterization, 16β-iodo-4-pregnen-17α-ol-3,20-dione 3-ethylenethioketal is obtained as white prisms which melt at 153–154° C. (with decomposition) by recrystallization from methylene chloride-ether.

Analysis.—Calcd. for $C_{23}H_{33}O_2S_2I$: C, 51.87; H, 6.25. Found: C, 52.04; H, 6.30.

λλ Max.: 2.92, 5.83, 10.20, 11.71, 12.02, 12.81, 13.37, 13.97μ.

EXAMPLE XII

16β-bromo-4-pregnen-17α-ol-3,20-dione 3-trimethylenethioketal

A mixture of 1.0 g. of 16α,17α-epoxyprogesterone 3-trimethylenethioketal, 10 ml. of acetic acid, and 1.0 ml. of 30% hydrogen bromide-in-glacial acetic acid is stirred at 18° C. for fifteen minutes and then at 25° C. for thirty minutes, and then it is slowly diluted with 30 ml. of water. The insoluble crystalline white bromohydrin is filtered off, washed well with water and dried in air. The 1.25 g. of crude product thus obtained is suitable for reduction with Raney nickel.

For characterization, 16β-bromo-4-pregnen-17α-ol-3,20-dione 3-trimethylenethioketal is recrystallized from ethyl ether to white prisms which melt at 175–177°.

Analysis.—Calcd. for $C_{24}H_{35}O_2S_2Br$: C, 57.70; H, 7.06. Found: C, 57.89; H, 7.21.

λλ Max.: 2.92, 5.81, 9.53, 10.18, 11.70, 12.26, 12.89, 13.23, 13.85μ.

EXAMPLE XIII

6α-methyl-4-pregnen-17α-ol-20-one

One teaspoon (approximately 11 g.) of Raney nickel catalyst, after neutralization with acetic acid and washing with water and methanol, is suspended in 200 ml. of methanol. This mixture is stirred while a solution of 6α-methyl-16β-bromo-4-pregnen-17α-ol-3,20-dione 3-ethylenethioketal (from 0.8 g. of 6α-methyl-16α,17α-epoxyprogesterone 3-ethylenethioketal) in 50 ml. of tetrahydrofuran is added and the reaction mixture is stirred at 25° C. for two hours. After removal of the catalyst by filtration, the methanolic filtrate is concentrated under reduced pressure and the residue is dissolved in methylene chloride. This solution is washed with water, dried with magnesium sulfate, and concentrated under reduced pressure to a slightly tacky crystalline residue whose infrared spectrum is in excellent accord with that of 6α-methyl-4-pregnen-17α-ol-20-one prepared by other methods. If desired, it may be recrystallized from methanol to afford white prisms which melt at 182–186° C.

λλ Max.: 2.88, 5.88, 7.40, 9.10, 12.38, 14.83μ.

EXAMPLE XIV

4-pregnen-17α-ol-20-one

Two teaspoons (approximately 22 g.) of Raney nickel catalyst, after neutralization with acetic acid and washing with water and methanol, is suspended in 200 ml. of methanol. This mixture is stirred while a solution prepared from the crude 16β-bromo-4-pregnen-17α-ol-3,20-dione 3-ethylenethioketal (from 1.0 g. of the corresponding 16α,17α-epoxide) in 20 ml. of tetrahydrofuran is added. The reaction mixture is stirred at 25° C. for one and one-half hours and then it is filtered to remove the catalyst. The methanolic filtrate is evaporated to dryness and the solid residue is dissolved in ethyl ether which is washed with water and then evaporated to a crystalline residue which is recrystallized from ethanol to afford 4-pregnen-17α-ol-20-one as white prisms.

For use in the identical procedure, the 16β-bromo-4-pregnen-17α-ol-3,20-dione 3-ethylenethioketal may be replaced by:

16β-bromo-4-pregnen-17α-ol-3,20-dione 3-trimethylene thioketal
16β-chloro-4-pregnen-17α-ol-3,20-dione 3-ethylene thioketal
16β-chloro-4-pregnen-17α-ol-3,20-dione 3-trimethylenethioketal
16β-iodo-4-pregnen-17α-ol-3,20-dione 3-ethylenethioketal
16β-iodo-4-pregnen-17α-ol-3,20-dione 3-trimethylenethioketal On the overall basis, 1.0 g. of 16α,17α-epoxyprogesterone 3-ethylenethioketal gave: through the chlorohydrin, 0.81 g. of 17α-ol of M.P. 177–180° C.; through the bromohydrin, 0.60 g. of the 17α-ol of M.P. 177–179° C.; through the iodohydrin, 0.74 g. of 17α-ol of M.P. 181–183° C. The corresponding 3-trimethylenethioketal gave, through the bromohydrin, 0.57 g. of the 17α-ol of M.P. 179–181° C. All of these products are 4-pregnen-17α-ol-20-one and, indeed, have identical infrared spectra.

*Analysis.*—Calcd. for $C_{21}H_{32}O_2$: C, 79.69; H, 10.19. Found: C, 79.98; H, 10.40.

λλ Max.: 2.88, 5.89, 11.21, 12.30, 14.92μ.

EXAMPLE XV

6α-methyl-4-pregnen-17α-ol-20-one acetate

A solution of the crude 6α-methyl-4-pregnen-17α-ol-20-one from Example XIII in 5 ml. of glacial acetic acid is treated with 4 ml. of trifluoroacetic anhydride and the resulting solution is maintained at 40–50° C. for ten minutes and then is poured into 200 g. of ice-water mixture. After the insoluble acetylation product has become crystalline, it is filtered off and dissolved in methylene chloride. The latter solution is washed with aqueous potassium bicarbonate, dried with magnesium sulfate, and concentrated under reduced pressure. The residue is developed onto a column of neutral alumina. Elution with 1:1 ether-benzene affords crystalline residues of 6α-methyl-4-pregnen-17α-ol-20-one acetate which are combined and recrystallized from methanol to afford white prisms which melt at 168–170° C. and which have an infrared spectrum identical with that of material prepared by an earlier, alternative method.

λλ Max.: 5.75, 5.82, 7.30, 8.00, 10.37μ.

It is to be understood that the invention is not to be limited to the exact details of operation or the exact compounds shown and described as obvious modifications and equivalents will be apparent to one skilled in the art, and the invention is therefore to be limited only by the scope of the appended claims.

What is claimed is:

1. A compound of the formula selected from the group consisting of (I)

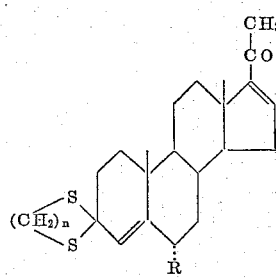

wherein
R is selected from the group consisting of hydrogen and methyl, and
n is an integer from 2 to 3, and (II)

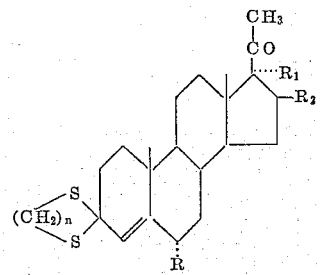

wherein
R is selected from the group consisting of hydrogen and methyl,
$R_1$ is hydroxyl,
$R_2$ is selected from the group consisting of bromine, chlorine and iodine,
$R_1$ and $R_2$, taken together, are oxygen and
n is an integer from 2 to 3.

2. A compound of the formula

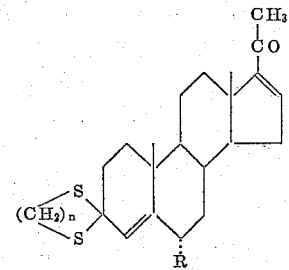

wherein
R is selected from the group consisting of hydrogen and methyl, and
n is an integer from 2 to 3.

3. 6α-methyl-4,16-pregnadiene-3,20-dione 3 - ethylenethioketal.

4. 6α-methyl-4,16-pregnadiene-3,20-dione 3 - trimethylenethioketal.

5. 4,16-pregnadiene-3,20-dione 3-ethylenethioketal.

6. 4,16-pregnadiene - 3,20 - dione 3 - trimethylenethioketal.

7. A compound of the formula

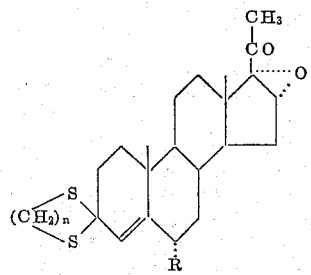

wherein
R is selected from the group consisting of hydrogen and methyl, and
n is an integer from 2 to 3.

8. 6α-methyl-16α,17α-epoxyprogesterone 3-ethylenethioketal.

9. 6α-methyl-16α,17α-epoxyprogesterone 3-trimethylenethioketal.

10. 16α,17α-epoxyprogesterone 3-ethylenethioketal.

11. A compound of the formula

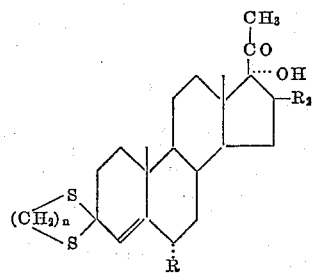

wherein
R is selected from the group consisting of hydrogen and methyl,
$R_2$ is selected from the group consisting of bromine, chlorine and iodine, and
n is an integer from 2 to 3.

12. 6α-methyl-16β-bromo-4-pregnen-17α-ol-3,20-dione 3-ethylenethioketal.

13. 6α-methyl-16β-bromo-4-pregnen-17α-ol-3,20-dione 3-trimethylenethioketal.

14. 6α-methyl-16β-chloro-4-pregnen-17α-ol-3,20-dione 3-ethylenethioketal.

15. 6α-methyl-16β-chloro-4-pregnen-17α-ol-3,20-dione-3-trimethylenethioketal.

16. 6α-methyl-16β-iodo-4-pregnen-17α-ol-3,20-dione-3-ethylenethioketal.

17. 6α-methyl-16β-iodo-4-pregnen-17α-ol-3,20-dione-3-trimethylenethioketal.

18. A method of preparing a compound of the formula

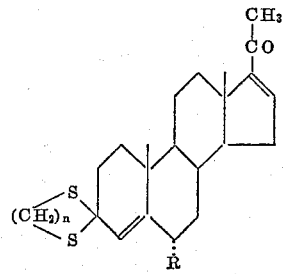

wherein
R is selected from the group consisting of hydrogen and methyl, and
n is an integer from 2 to 3,
which comprises reacting a compound of the formula

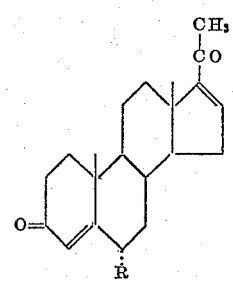

wherein R has the meaning set forth above with an alkyl dithiol selected from the group consisting of ethanedithiol, 1,2-propane dithiol and 1,3-propanedithiol, in the presence of pyridine hydrochloride.

References Cited by the Examiner
UNITED STATES PATENTS

| | | | |
|---|---|---|---|
| 2,744,108 | 5/56 | Ralls | 260—239.5 |
| 2,773,868 | 12/56 | Agnello et al. | 260—239.55 |
| 2,789,989 | 4/57 | Julian et al. | 260—239.55 |
| 2,887,478 | 5/59 | Julian et al. | 260—239.5 |

LEWIS GOTTS, *Primary Examiner.*